(12) United States Patent
Papavasiliou et al.

(10) Patent No.: US 8,941,907 B2
(45) Date of Patent: Jan. 27, 2015

(54) MICROELECTROMECHANICAL OPTICAL SHUTTER SYSTEM

(75) Inventors: Alexandros P. Papavasiliou, Thousand Oaks, CA (US); Robert E. Mihailovich, Newbury Park, CA (US); John E. Mansell, Thousand Oaks, CA (US); Graham J. Martin, Woodland Hills, CA (US)

(73) Assignee: Teledyne Scientific & Imaging, LLC., Thousand Oaks, CA (US)

( * ) Notice: Subject to any disclaimer, the term of this patent is extended or adjusted under 35 U.S.C. 154(b) by 443 days.

(21) Appl. No.: 12/963,578

(22) Filed: Dec. 8, 2010

(65) Prior Publication Data

US 2012/0162741 A1   Jun. 28, 2012

(51) Int. Cl.
    *G02B 26/02*   (2006.01)
    *B29D 11/00*   (2006.01)
    *G02B 6/35*    (2006.01)
    *G02B 26/08*   (2006.01)

(52) U.S. Cl.
    CPC .......... *B29D 11/00663* (2013.01); *G02B 6/353* (2013.01); *G02B 26/0841* (2013.01); *G02B 6/3518* (2013.01); *G02B 6/3552* (2013.01); *G02B 6/357* (2013.01)
    USPC ...................................... 359/230

(58) Field of Classification Search
    CPC ............ B41J 11/70; B41J 15/04; B41J 3/445; B41J 2/14427; B41J 2/1623; B41J 2002/041; B41J 2/1646

USPC ............. 359/227, 230; 385/25, 16, 18, 39, 40
See application file for complete search history.

(56) References Cited

U.S. PATENT DOCUMENTS

| | | | |
|---|---|---|---|
| 6,205,267 B1 | 3/2001 | Aksyuk et al. | |
| 6,459,845 B1 | 10/2002 | Lee et al. | |
| 6,520,777 B2 | 2/2003 | Cho et al. | |
| 6,671,078 B2 | 12/2003 | Flanders et al. | |
| 6,718,114 B2 | 4/2004 | Hong et al. | |
| 6,775,459 B2 | 8/2004 | Hong et al. | |
| 6,816,295 B2 | 11/2004 | Lee et al. | |
| 6,901,204 B2 | 5/2005 | Hong et al. | |
| 6,934,428 B2 | 8/2005 | Kim | |
| 7,113,689 B2 | 9/2006 | Hong et al. | |
| 2002/0102059 A1* | 8/2002 | Cho et al. ........................ | 385/49 |
| 2002/0104331 A1* | 8/2002 | Fukuyama et al. ............... | 65/61 |
| 2002/0191267 A1* | 12/2002 | Flanders et al. .............. | 359/254 |
| 2004/0196522 A1* | 10/2004 | Lee et al. ...................... | 359/227 |

* cited by examiner

*Primary Examiner* — William Choi
*Assistant Examiner* — Sharrief Broome
(74) *Attorney, Agent, or Firm* — Brooks Acordia IP Law, PC

(57) ABSTRACT

A microelectromechanical shutter system includes an actuator beam formed in a substrate, at least one actuator electrode spaced apart and electrically isolated from the actuator beam, the at least one actuator electrode angling away from a base of the actuator beam to actuate the actuator beam using a zipper action, and a fiber-optic channel in the substrate to receive a fiber-optic cable. A shutter mirror is included on a distal end of the actuator beam, with the shutter mirror in substantial alignment with a centerline of the fiber-optic channel. Upon application of a voltage between the actuator beam and the at least one actuator electrode, an electrostatic force is created between them to move the shutter mirror across the end of the fiber-optic channel.

10 Claims, 6 Drawing Sheets

MICROELECTROMECHANICAL OPTICAL SHUTTER SYSTEM

GOVERNMENT RIGHTS

This invention was made with Government support under Contract No. W911NF-04-1-0043 awarded by the Defense Advanced Research Projects Agency (DARPA). The Government has certain rights in this invention.

BACKGROUND OF THE INVENTION

1. Field of the Invention

This invention relates to microelectromechanical systems, and more particularly to microelectromechanical optical shutters and switches.

2. Description of the Related Art

Microelectromechanical systems (MEMS) may be used with or without electro-optical devices to provide optical shuttering and optical switching between an input and output fiber. Of primary concern for such systems is optical isolation, insertion loss, and high-speed operation. Proper alignment of the input and output fibers to reduce insertion loss and manufacturing cost are also important design considerations for such system.

Attempts have been made to provide a switchable MEMS mirror between adjacent input and output fibers to either block the transmitted beam or to provide reflection to maintain transmission. Unfortunately, such systems typically require assembly of multiple components to provide both the desired speed and isolation. A need still exists for a highly manufacturable shutter system that provides high isolation and low return loss with fast switching speeds and while maintaining low power requirements.

SUMMARY OF THE INVENTION

A microelectromechanical shutter system is disclosed that has high isolation, low return loss and that has low power requirements while maintaining fast switching speeds. The system includes an actuator beam formed in a substrate, at least one actuator electrode spaced apart and electrically isolated from the actuator beam, the at least one actuator electrode angling away from a base of the actuator beam to actuate the actuator beam using a zipper action. A fiber-optic channel in the substrate may receive a fiber-optic cable, when a fiber-optic cable is present. A shutter mirror is included on a distal end of the actuator beam, with the shutter mirror in substantial alignment with a centerline of the fiber-optic channel. Upon application of a voltage between the actuator beam and the at least one actuator electrode, an electrostatic force is created between them to move the shutter mirror across the end of the fiber-optic channel.

A method is disclosed that includes etching a fiber-optic channel in a substrate, etching a mirror on a distal end of an actuator beam in the substrate, the mirror aligned with the fiber-optic channel, and etching an actuator electrode in the substrate, wherein the mirror is on a distal end of the actuator beam.

BRIEF DESCRIPTION OF THE DRAWINGS

The components in the Figures are not necessarily to scale, emphasis instead being placed upon illustrating the principals of the invention. Like reference numerals designate corresponding parts throughout the different views.

DETAILED DESCRIPTION OF THE INVENTION

A microelectromechanical fiber optic shutter assembly is disclosed that has high isolation, low return loss and that has low power requirements while maintaining fast switching speeds. In a preferred embodiment, the system makes use of V-grooves formed in a substrate to accurately align seated input and output angle-cut fibers to enable a low return loss. A smooth, reflective shutter also formed from the substrate is operable between the fibers to reflect a beam otherwise transmitted between them to an optical dump to enable high isolation. A small-mass cantilever (actuator beam) with a zipper actuator preferably enables the high-speed actuation of the reflective shutter at practical control voltages (preferably <100 usec at <100 V.)

Figure 1:
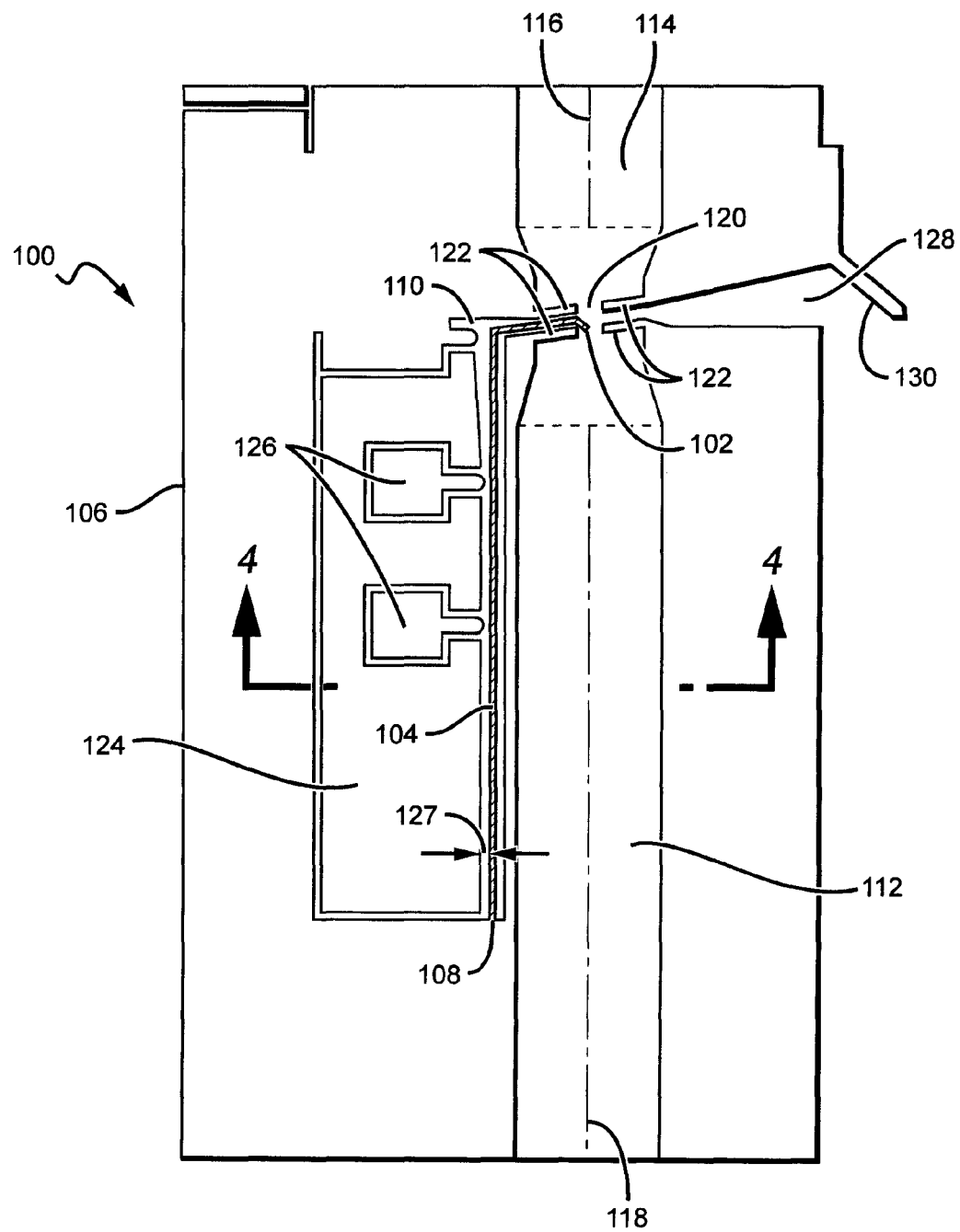
FIG. 1 is a plan view of a fiber optic shutter assembly in accordance with one embodiment of the invention.

FIG. 1 illustrates one embodiment of a fiber optic shutter assembly that may be fabricated in a substrate to provide fast shutter actuation times, low loss, high isolation and low back reflection. A shutter mirror 102 is formed on a distal end of an actuator beam 104 that extends from a substrate, preferably a silicon-on-insulator (SOI) substrate 106, at an actuator beam root 108. The actuator beam 104 is formed from the substrate 106 in an actuator beam channel 110. The channel 110 generally runs parallel to an adjacent fiber optic channel that is preferably shaped in the form of a V-channel 112 to receive a fiber optic cable. A second fiber optic channel, also preferably shaped in the form of a V-channel 114, is also formed in the substrate 106. Although labeled as V-channels, the channels are defined by linear and angled side walls that may or may not form a single truncated "V" shape, with a base of the channel defined by a portion of the dielectric layer in the SOI substrate 106. The first and second V-channels (110, 112) have respective longitudinal centerlines (116, 118) that are preferably parallel but offset from each other to accommodate communication of a refracted beam between cut angled ends of two fiber optic cables, when such fiber optic cables are present, with the cut angled ends reducing optical return loss. In an alternative embodiment, the first and second V-channels (110, 112) are not offset from each other to accommodate straight-cut fiber ends (i.e. not angle-cut fibers).

The shutter mirror 102 is aligned with the centerline 116 of the second V-channel 114 (a "beam input" fiber), preferably in an un-actuated state of the shutter mirror 102, with each of the shutter mirror 102 and centerlines (116, 118) generally aligned with an aperture 120 formed in the substrate 106. Or, the shutter mirror 102 may be aligned in its actuated state with the second V-channel 114. Fiber stops 122 are preferably aligned with the V-channels (112, 114) on either side of the shutter mirror 102 at the aperture 120 to prohibit fiber optic cables, when seated in respective V-channels (112, 114), from impinging on the shutter mirror 102.

The actuator beam channel 110 is defined by opposing side walls in the substrate 106, with one of the side walls an actuator electrode 124 that is electrically isolated from the remainder of the substrate 106 and actuator beam 104. Actuator stops 126 extend into the actuator beam channel 110 to prevent the actuator beam 104 from contacting the actuator electrode 124. A gap 127 defined between the actuator electrode 124 and actuator beam 104 is smaller at the actuator beam root 108, and widens as the actuator beam extends linearly away from the beam root 108. The substrate 106 and actuator beam are preferably in electrical communication, with the actuator electrode 124 insulated from both.

An optical dump cavity 128 is formed in the substrate 106, with the optical dump 128 extending away from the aperture 120 initially perpendicularly to the center-line axes (116, 118). The optical dump 128 has a dump mirror 130 to direct light reflected from the shutter mirror 102 to a path away from both the fiber optic cables (when present) and the aperture 120.

During operation, a beam is provided through the beam input fiber (not shown), exits the beam input fiber and is presented to the aperture 120 adjacent the shutter mirror 102. If the shutter is in the "block" position, the beam is reflected off of the shutter mirror 102 towards the optical dump 128 where it is further reflected off of the dump mirror 130 and away from the area of the aperture 120. If the shutter is directed to the "transmit" position, a voltage differential would be applied between the substrate/shutter beam (106, 104) and the actuator electrode 124 resulting in an electrostatic attractive force between them. Because the gap 127 between the shutter beam 104 and actuator electrode 124 is less at the actuator beam root 108 than towards the mirror end of the beam actuator, a "zipper" action is created as the actuator beam 104 moves towards the actuator electrode 124 and against the shutter beam stops 126 up through the actuator beam channel 110 towards the shutter mirror 102, with the shutter mirror 102 being pulled generally linearly out of the path of the beam. In an alternative embodiment, the gap 127 may be constant between the shutter beam 104 and actuator electrode 124 along the actuator beam channel 110. If the voltage differential is removed, the shutter beam 104 would return to its natural state due to natural spring action to push the shutter mirror 102 back towards the center of the aperture 120.

Figure 2:
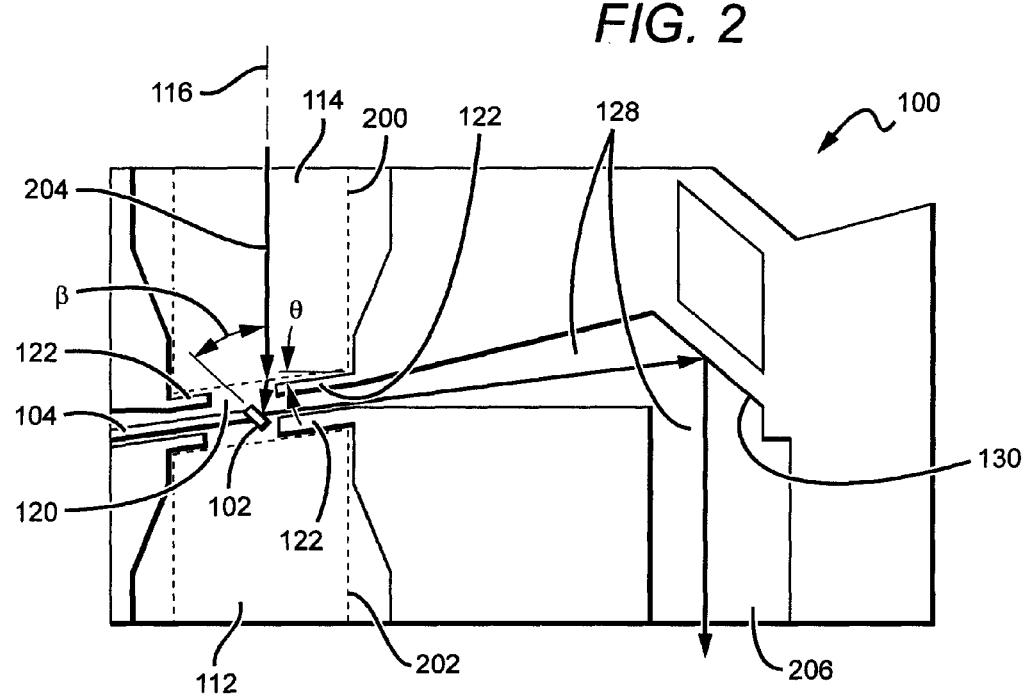
FIG. 2 is a plan view of the fiber optic shutter assembly illustrated in FIG. 1 with a beam diverted into an optical dump.
Figure 3:
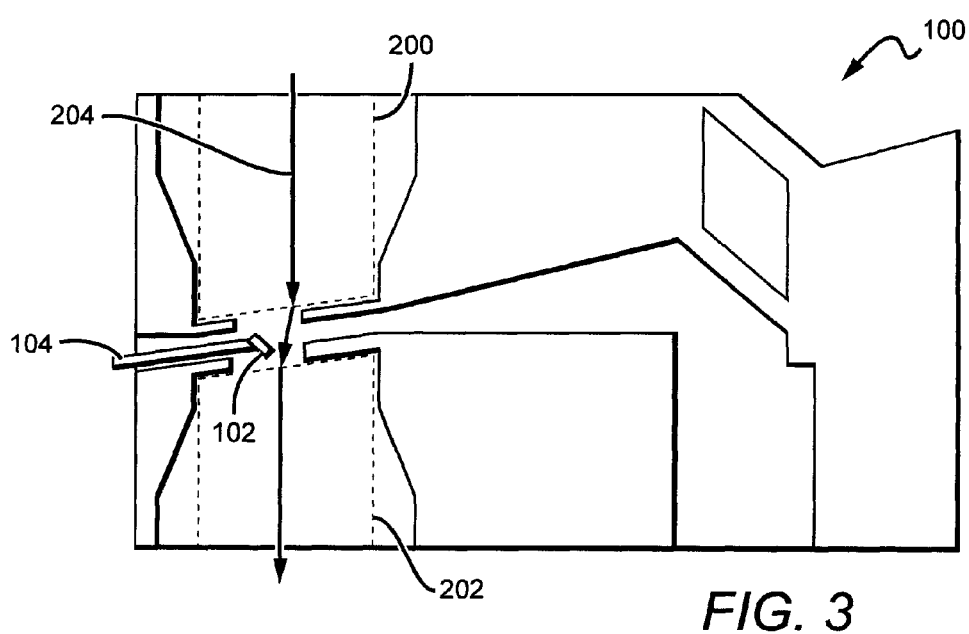
FIG. 3 is a plan view of the fiber optic shutter assembly illustrated in FIG. 1, with the beam being transmitted to an output fiber.

FIGS. 2 and 3 are top plan views of the fiber optic shutter assembly of FIG. 1, that each have a ray diagram illustrating beam blocking and transmitting positions of the shutter mirror 102, respectively. Input and output fiber optic cables (200, 202) are illustrated in the first and second V-channels (114, 112) for clarification, respectively, and are indicated with dashed lines. An incoming beam 204 travels through the center of input fiber optic cable 200, preferably along its centerline 116. The input beam 204 exits the input fiber optic cable 114, is refracted towards the shutter mirror 102 that is at an angle beta from the centerline 116 to receive and reflect the input beam 204 away from the input and output fiber optic cables (200, 202) towards the optical dump 128. The beam is reflected off of the dump mirror 130 in the optical dump 128 towards a remote portion 206 of the optical dump that is physically removed from the area of the aperture 120 to increase isolation for the shutter assembly. As illustrated, the remote portion 206 of the optical dump 128 is a channel having a square cross section that is parallel to the V-channels (112, 114) to receive the beam from the dump mirror 130 and to reduce reflection back to the area of the aperture 120. In alternative embodiments, the optical dump 128 may have further mirrors and channels to prevent reflection towards the aperture 120 or may remove the beam to an optical dump in a dimension outside of the plane formed by the channel centerlines (116, 118), each in an effort to reduce reflection back to the area of the aperture 120 to increase isolation for the shutter assembly.

In FIG. 3, the shutter mirror 102 is positioned outside of the path of the input beam 204 to allow the input beam 204 to exit the input fiber optic cable 200 for presentation to the output fiber optic cable 202 and further transmission through the fiber optic shutter assembly 100.

Figure 4:
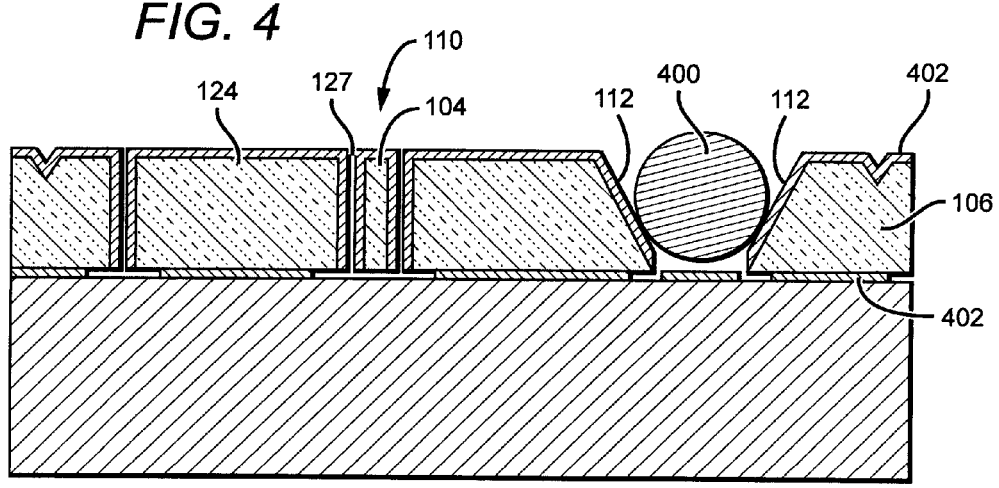
FIG. 4 is a cross-sectional view of the fiber optic shutter assembly illustrated in FIG. 1 about the line 4-4, with the addition of a fiber optic cable seated in a V-channel of the assembly.
Figure 5:
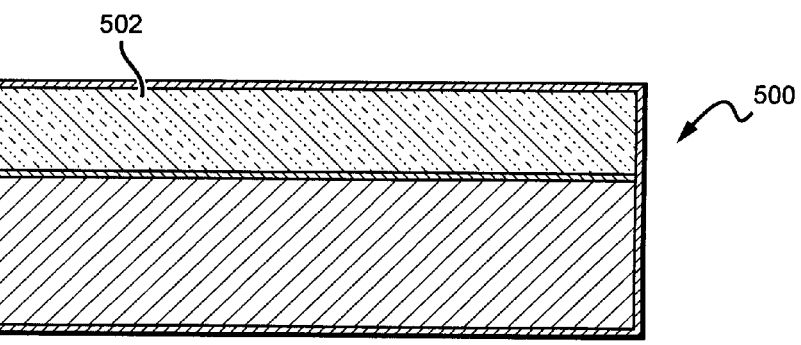
FIGS. 5-12 illustrate fabrication steps for one embodiment of a fiber optic shutter assembly.

FIG. 4 illustrates a cross section of the fiber optic shutter assembly illustrated in FIG. 1 about the line 4-4 and having a representative fiber optic cable. The output fiber optic cable 400 is seated on opposing walls of the V-channel 112 with a center of the fiber optic cable 400 at a level below the surface of the substrate 106. The actuator beam 104 is etched free of an oxide layer 402 of the SOI substrate 106 and formed immediately opposite from the actuator electrode 124 so that application of a voltage potential between the actuator beam 104 (extending from the substrate 106) and the actuator electrode 124 results in an electro-static force between the components. Although in FIG. 4 the actuator beam channel 110 does not allow significant travel towards the actuator electrode 124, as illustrated in FIG. 1, the actuator beam channel width increases from the actuator beam root 108 (not shown) to the distal end towards the shutter mirror, as does the gap 127 to allow sufficient travel of the shutter mirror away from the beam path (FIG. 1). A metal layer 402 is deposited on the upper surface of the substrate 106, on side walls of the V-channel 112 on the top and side walls of the actuator beam 104 and the actuator electrode 124. The oxide layer 402 originally provided with the SOI substrate 106 remains but is partially undercut from the V-channel 112 and actuator electrode 124.

Figure 6:
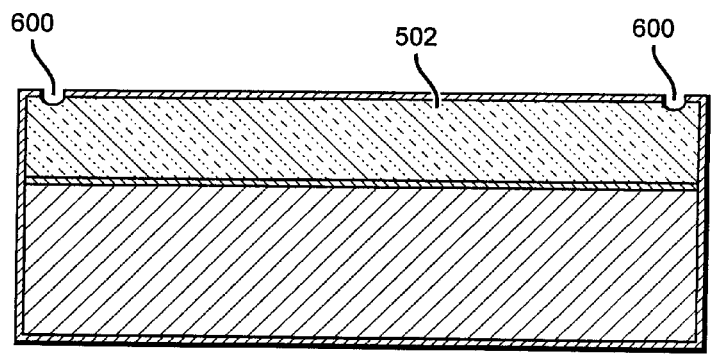
Figure 7:
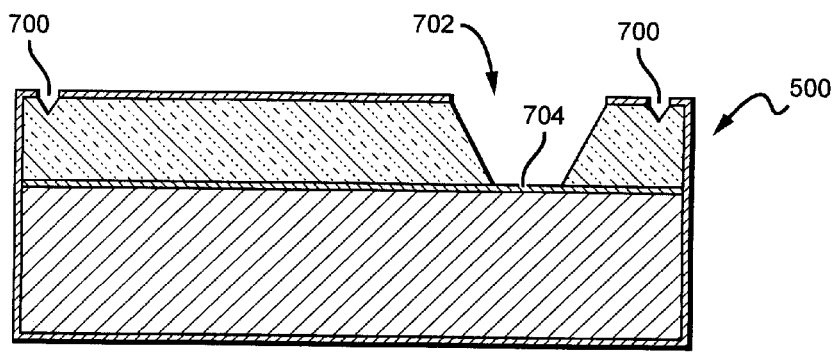

FIGS. 5-12 illustrate interim steps in one embodiment of a fabrication process to manufacture the MEMS shutter. A substrate wafer, preferably a silicon-on-insulator (SOI) wafer 500 (although non-SOI wafers may be used), has a thickness that enables a fiber seated in the V-channel 112 (see above) to have its core just below the wafer's surface, such as 95 um thick device layer SOI wafer 500 in support of a typical fiber diameter of approximately 125 um. The wafer 500 preferably has a thermal oxidation layer 502 of $SiO_2$ of approximately 5000 Angstrom formed on its outer surfaces. FIG. 6 illustrates a plurality of crystal orientation marks 600 patterned through the oxide layer 502 preferably using an optical photoresist lithography and reactive ion etch (RIE) process, with FIG. 7 illustrating the marks 600 after subjected to an alkali hydroxide etching process, such as a tetramethylammonium hydroxide (TMAH) etching process, to create a plurality of crystal alignment trenches 700 used to determine the crystal plane orientation of the SOI wafer 500. Also in FIG. 7, a fiber optic channel, preferably in the form of a V-groove 702, is patterned and etched after determining and following the crystal plane orientation, preferably using a TMAH etching process, down to an oxide layer 704 of the SOI wafer 500. Or, a potassium hydroxide (KOH) etch may be used. The TMAH etching process continues until the V-groove 702 has upper trench and lower trench etch widths that are predetermined to receive the outer diameter of a fiber optic cable.

Figure 8:
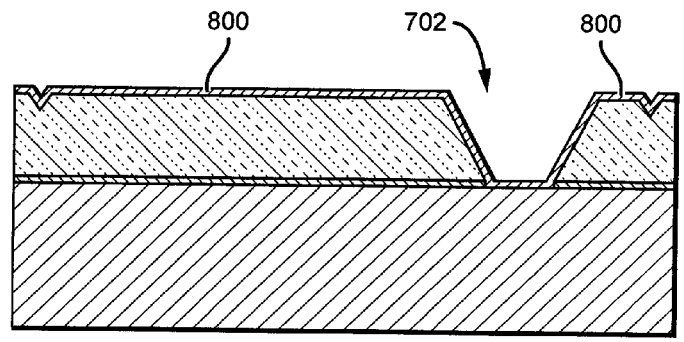
Figure 9:
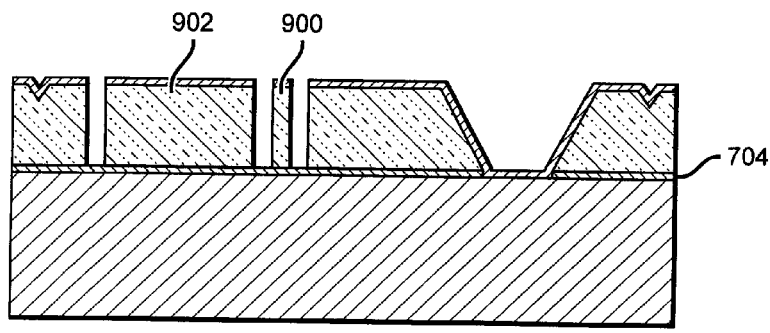

In FIG. 8, the oxide layer 502 is removed using a hydrofluoric acid (HF) etch and a resist coating 800 applied, preferably by spray coating a uniform layer of resist conformally over the V-groove 702 using a fine mist, such as that provided by model EVG-101 manufactured by Carl Zeiss NTS GmbH of Germany. In FIG. 9, optical lithograpy is used to pattern the shutter 900, actuator electrode 902 and other features of the shutter assembly and an RIE etch process used to etch down to the oxide layer 704 to complete the deep trench features of the MEMS shutter.

Figure 10:
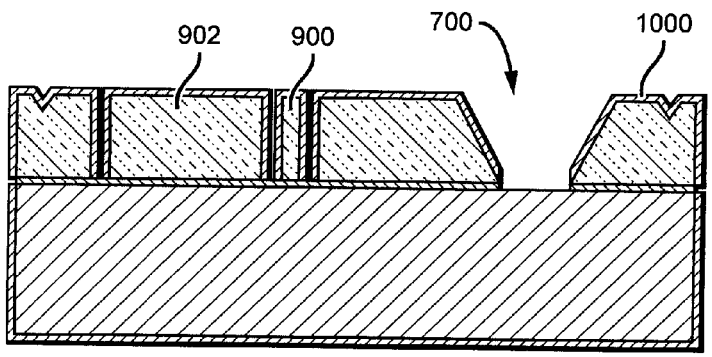
Figure 11:
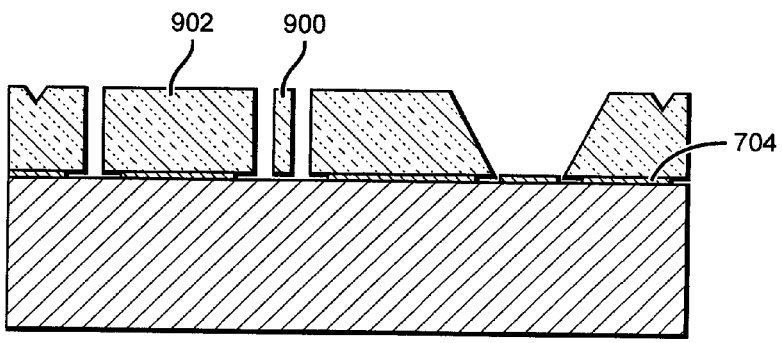
Figure 12:
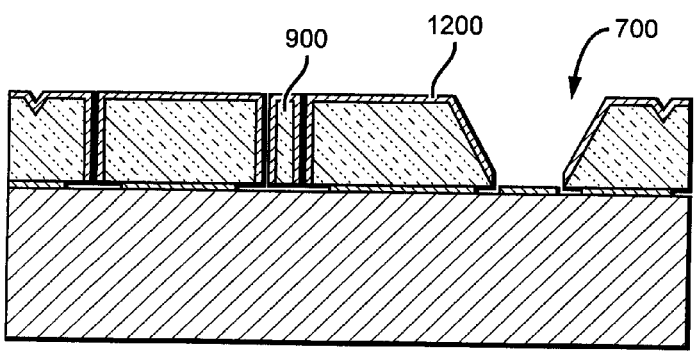

In FIG. 10, an oxide layer 1000 is illustrated on surfaces of the V-trench 700, shutter 900 and actuator electrode 902, formed using a wet thermal oxidation process to target a thickness of 5000 Angstrom. FIG. 11 illustrates that the oxide layer 1000 has been removed, preferably using an HF release process or other wet or dry anisotropic etching process, to smooth the previously-etched features and to undercut a portion of the oxide layer 704 from underneath the shutter 900 and actuator electrode 902 to free the shutter 900 for movement from the wafer. The HF release process provides undercut sufficient to release moving parts from the oxide layer 702, such as the shutter 900, for later actuation. In FIG. 12, metal, preferably Au, is sputtered to create a metal layer 1200 having target a thickness of 3000 Angstrom to receive the fiber optic cable in the V-trench and to provide for a reflective internal surfaces of the device, including shutter 900.

Figure 13:
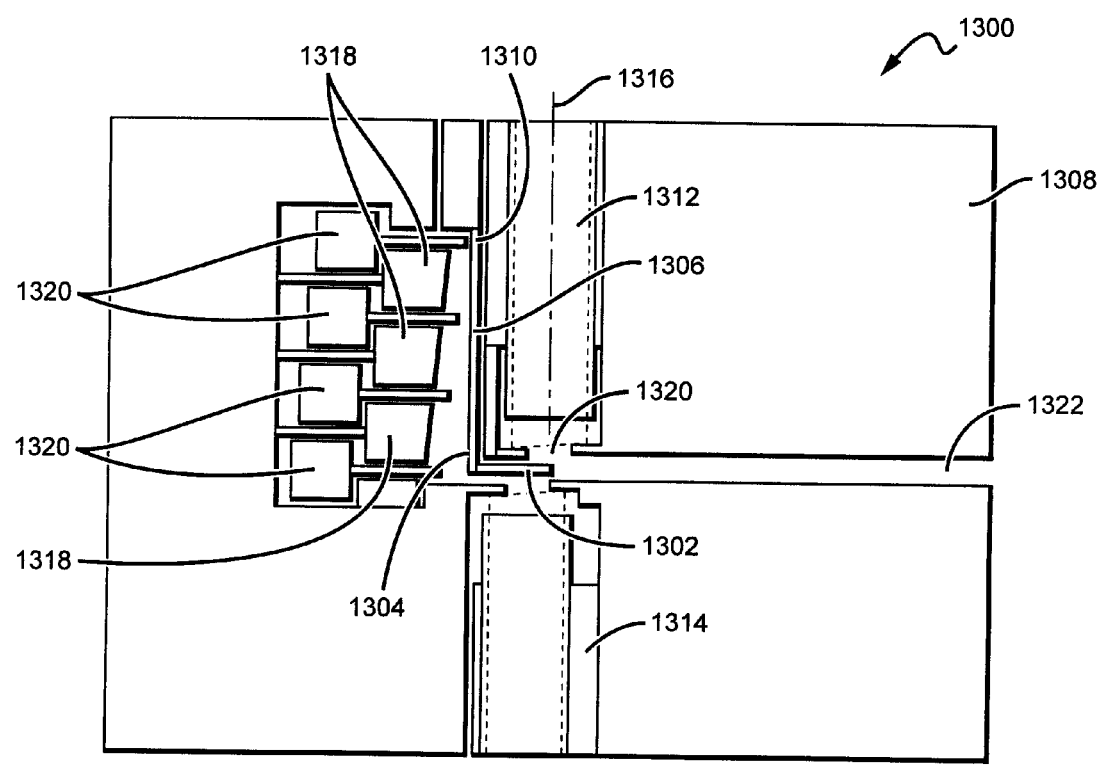
FIG. 13 is a top plan view of another embodiment of a fiber optic shutter assembly.

FIG. 13 illustrates another embodiment of a fiber optic shutter assembly 1300 that has a plurality of actuator electrodes and an optical dump cavity. A shutter mirror 1302 is formed on a distal end 1304 of an actuator beam 1306 that extends from a substrate 1308 at an actuator beam root 1310. First and second V-channels (1312, 1314) are provided to receive respective fiber optic cables (indicated by dashed lines). The shutter mirror 1302 is aligned with the centerline 1316 of the first V-channel 1312, or with the center of the fiber optic cable if different than the center line, preferably in an unactuated state of the shutter mirror 1302. A plurality of actuator electrodes 1318 are formed along and spaced apart from the actuator beam 1306 at progressively further gaps from the actuator beam 1306 to provide a "zipper" action as a voltage is applied across the actuator beam 1306 and actuator electrodes 1318. A plurality of actuator stops 1320 are interleafed between the actuator electrodes and project beyond them to prevent the actuator beam 1306 from contacting the actuator electrodes 1318. An optical dump 1322 is formed in the substrate 1308, with the optical dump 1322 extending away from the aperture 1320 initially perpendicularly to the centerline 1316.

We claim:

1. An apparatus, comprising:
   an actuator beam formed in a substrate;
   at least one actuator electrode spaced apart and electrically isolated from said actuator beam, said at least one actuator electrode angling away from a base of said actuator beam to actuate said actuator beam using a zipper action; and
   a fiber-optic channel in said substrate to receive a fiber-optic cable, when a fiber-optic cable is present;
   a shutter mirror on a distal end of said actuator beam, said shutter mirror in substantial alignment with a centerline of said fiber-optic channel; and
   an optical dump cavity configured to receive a light beam redirected from said shutter mirror when said shutter mirror is directed into a fiber optic light path of said aperture;
   wherein application of a voltage between said actuator beam and said at least one actuator electrode results in an electrostatic force between them to move said shutter mirror away from said centerline of said fiber-optic channel.

2. The apparatus of claim 1, wherein said fiber-optic channel is shaped as a V-groove.

3. The apparatus of claim 2, further comprising an output V-channel to receive a second fiber optic cable, said fiber-optic channel and said output V-channel having respective centerlines that are offset from one another to allow for beam diffraction as a beam is communicated from an angled face of the fiber optic cable to an angled face of the output V-channel.

4. The apparatus of claim 1, wherein said optical dump cavity comprises a cavity removed from the vicinity of said aperture and said fiber-optic cable, when a fiber-optic cable is present.

5. The apparatus of claim 4, further comprising a dump mirror to receive and reflect a beam presented from said shutter mirror.

6. The apparatus of claim 1, further comprising an actuator beam stop to prevent said actuator beam from contacting said actuator electrode.

7. The apparatus of claim 1, further comprising a plurality of fiber stops formed in said substrate adjacent to said aperture to prevent lateral movement of the fiber-optic cable against said shutter mirror.

8. An apparatus, comprising:
   an actuator beam formed in a substrate;
   at least one actuator electrode spaced apart and electrically isolated from said actuator beam, said at least one actuator electrode having a portion angling away from a base of said actuator beam and configured to actuate said actuator beam using a zipper action;
   a V-shaped fiber-optic channel in said substrate configured to receive a fiber-optic cable, when a fiber-optic cable is present; and
   a shutter mirror on a distal end of said actuator beam, said shutter mirror in substantial alignment with a centerline of said fiber-optic channel;
   wherein application of a voltage between said actuator beam and said at least one actuator electrode results in an electrostatic force between them to move said shutter mirror away from said centerline of said fiber-optic channel.

9. The apparatus of claim 8, further comprising an output V-channel to receive a second fiber optic cable, said fiber-optic channel and said output V-channel having a respective center lines that are offset from one another to allow for beam diffraction as a beam is communicated from an angled face of said fiber optic cable to an angles face of said second fiber optic cable.

10. The apparatus of claim 8 further comprising:
    an optical dump cavity configured in the substrate to receive a light beam redirected from said shutter mirror when said shutter mirror is directed into a fiber optic light path of said aperture.

* * * * *